United States Patent Office 3,064,025
Patented Nov. 13, 1962

3,064,025
ALKYL THIOETHER AND DITHIOETHER-HEAVY
METAL CYANIDE ADDITION COMPOUNDS
Paul F. Warner, Phillips, and Bradford L. Archer and
Richard D. Franz, Borger, Tex., assignors to Phillips
Petroleum Company, a corporation of Delaware
No Drawing. Filed Aug. 14, 1959, Ser. No. 833,697
8 Claims. (Cl. 260—438)

This invention relates to heavy metal cyanide addition compounds of alkyl thioethers and alkyl dithioethers. In one of its aspects, the invention relates to a method for the preparation of such addition compounds by comingling the cyanide with the thioether. In a further aspect of the invention, it relates to a method in which the addition compounds are used for destroying such different and unrelated pests as crab grass and insects such as grasshoppers and cockroaches. In a further aspect of the invention, it relates to selective control of crab grass in Bermuda grass lawns.

We have now found that the alkyl thioethers and dithioethers form addition compounds with the heavy metal cyanides. For example, the cuprous cyanide addition compounds of di-n-butyl sulfide and 2,5-diathiahexane have been prepared by adding the cyanide to the thioether. The additions have been made at room temperature. The cuprous n-butyl sulfonium cyanide is a viscous oil with a greenish tint and the 2,5-dithiahexane-cuprous cyanide product is a white powder.

It is an object of the present invention to provide heavy metal cyanide addition compounds of alkyl thioethers and alkyl dithioethers. It is another object of the present invention to provide a method for the preparation of such addition compounds. It is a further object of the present invention to provide a crab grass herbicide, more especially a selective crab grass killer for killing crab grass in Bermuda grass lawns. It is still a further object of the invention to provide an insecticide for killing insects such as grasshoppers and cockroaches. It is another object of the invention to provide a method for killing crab grass, more especially crab grass in a Bermuda grass lawn. As a still further object of the invention, there is provided a method for killing insects such as grasshoppers and cockroaches.

Other aspects, objects and the several advantages of the invention are apparent from the present disclosure and the appended claims.

According to the present invention, addition compounds of heavy metal cyanides, such as cuprous cyanide, and of thioethers, such as the alkyl thioethers, and alkyl dithioethers, are formed by reacting together said compounds, for example, at room temperature. In one specific embodiment of the invention, di-n-butyl sulfide [(C₄H₉)₂S] is reacted with cuprous cyanide to form an addition product or compound containing one mol of di-n-butyl sulfide and one mol of cuprous cyanide. In another specific embodiment of the invention, 2,5-di-thiahexane (CH₃—S—CH₂CH₂—S—CH₃)

is admixed with cuprous cyanide (CuCN). There is formed an addition compound or product containing substantially one mol of 2,5-dithiahexane and two mols of cuprous cyanide.

The alkyl thioethers and the alkyl dithioethers, as exemplified by di-n-butyl sulfide and 2,5-dithiahexane, respectively, which are included within the scope of the present invention are those which contain 1 to 12 carbon atoms in the alkyl group. The alkyl group can be a primary, secondary, or tertiary alkyl group. The dithioethers which contain sulfur attached to terminal carbon atoms, as in 2,5-dithiahexane, are now preferred.

Cuprous cyanide, which is insoluble in water, is added to the thioether, according to the invention.

For example, the procedure for preparation of 2,5-dithiahexane-CuCN addition product is illustrated by the following equation.

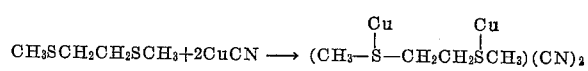

A 0.5 molar quantity of the 2,5-dithiahexane and a 1.0 molar quantity of cuprous cyanide were mixed in a 200 ml. beaker. No solvent or diluent other than the dithia ether was used. There was no immediate sign of reaction. A few drops of concentrated hydrochloric acid were added. This appeared to initiate some reaction. Additional dithia ether was added to fluidize the mass and the mixture was warmed gradually on a hot plate. The reaction "took off" with the liberation of considerable heat, sufficient to boil away part of the dithia ether. More dithia ether was added to keep the reaction mixture from going dry. After setting overnight, the product, a white powder, was filtered, washed with acetone and allowed to dry in air.

Also, for example, the procedure for the preparation of cuprous di-n-butyl sulfonium cyanide is illustrated by the following equation.

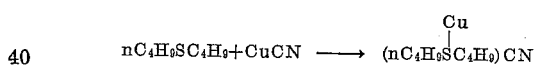

The normal butyl sulfide and cuprous cyanide were mixed in equimolar quantities in a 250 ml. beaker and let stand. There was immediate evidence of reaction by heat liberation. All of the cuprous cyanide went into solution. The product is a viscous oil with a greenish tint.

It appears that in each case one mol of cuprous cyanide is added to each sulfur atom of the thioether.

Though the thioethers and the cuprous cyanide will react without heating when the reaction is too slow to be practical, some heat can be added to initiate the reaction.

Also, according to the present invention, there is provided a method of killing insects which comprises applying to the insect an addition product of the invention. Still also according to the invention, there is provided a method for killing crab grass, especially as it can be selectively killed in a Bermuda grass lawn, by applying to said crab grass, an effective amount of an addition compound of the invention such as 2,5-dithiahexane-CuCN.

EXAMPLE I

*Insecticide tests.*—The following tabulations show the insecticidal properties of 2,5-dithiahexane-cuprous cyanide and cuprous di-n-butyl sulfonium cyanide:

Table 1

| Compound | Concentration applied, weight percent | Percent dead | |
|---|---|---|---|
| | | Grasshoppers,[1] 2 days | Cockroaches, 2 days |
| 2,5-dithiahexane-CuCN | { [2] 0.2 | 100 | 90 |
| | [3] Powder | 75 | 80 |
| Control insects | | 60 | 0 |

[1] Average of two separate tests of 10 grasshoppers each.
[2] The meaning of "0.2" and "1.0" in the column labeled "concentration applied, weight percent" means the insecticide was emulsified in water to the specified concentration. A 0.2 weight percent application would correspond to 0.2 gram of insecticide being emulsified in 99.8 grams of water and emulsifier. Tritons X-151 and X-171 were used for 2,5-dithiahexane-CuCN addition product and Triton X-171 was used for cuprous n-butyl sulfonium cyanide. Water was used as the carrier in all of our tests. Other emulsifiers can be used, if desired, in lieu of those here mentioned.
[3] The term "powder" means the insecticide, without carrier, was sprinkled into the container containing the insects. The insects' food, as well as they themselves, came into contact with the powder. Approximately 1.0 gram of insecticide, in powder form, was used in the tests.

NOTE.—The mortality rate for the cockroach control was nil.

Table 2

| Compound | Concentration applied, weight percent | Percent dead Grasshoppers,[1] 2 days |
|---|---|---|
| Cuprous di-n-butyl sulfonium cyanide | [2] 1.0 | 90 |
| Control insects | | 50 |

See table 1 for footnotes 1 and 2.

In the insecticide tests, the grasshoppers and cockroaches were placed in the same type containers but the control insects were without the insecticide. The containers used in the grasshopper tests were cardboard quart boxes with one side cut away and covered with screen wire. Ten grasshoppers were placed in each container. Grass and a small tree branch were added to provide food and perching space for the grasshoppers. Fresh grass was added each day during the test. Large beakers (1000 cc.) were used in the cockroach tests. A thin layer of Vaseline was applied near the top of the beaker to prevent the roaches from escaping. Ten cockroaches were placed in each beaker. A small portion of cat food was also placed in each beaker as food for the roaches. The compounds to be tested were applied as emulsions in water, sprayed directly into the container wetting the insects and container walls as well as the grass and cat food. One container of insects was left unsprayed as a control for each run.

The following tabulation gives the results of a series of tests on the insecticidal properties of 2,5-dithiahexane-cuprous cyanide addition compound and cuprous n-butyl sulfonium cyanide. These tests were run to determine whether the control mortality rate for grasshoppers could be lowered while still obtaining the high mortality rate for the insecticide.

Table 3

| Compound | Concentration applied, weight percent | Percent killed | | | |
|---|---|---|---|---|---|
| | | Grasshoppers | | Cockroaches | |
| | | 1 day | 2 days | 1 day | 2 days |
| 2,5-Dithiahexane-CuCN | {0.2 | 40 | 100 | 60 | 90 |
| | {Powder (100%) | 30 | 80 | 20 | 80 |
| Control | | 0 | 30 | 0 | 0 |
| Cuprous n-butyl sulfonium cyanide | {1.0 | 30 | 90 | | |
| | {0.5 | 10 | 60 | 40 | 40 |
| Control | | 0 | 40 | 0 | 0 |

As is seen, the control mortality rates for grasshoppers are substantially lower than those in the earlier tables of this example. The high mortality rate of the treated insecticides was about the same as before. The mortality rate for the cockroach control was nil. A concentration of 1.0 weight percent is now preferred for satisfactory kill power under most ordinary conditions.

EXAMPLE II

*Herbicide tests.*—The 2,5-dithiahexane-cuprous cyanide addition product was formulated according to the following tabulation:

| Formulation | 1 | 2 | 3 | 4 |
|---|---|---|---|---|
| | Grams | | | |
| 2,5-dithiahexane-CuCN | 2 | 3 | 4 | 5 |
| Ammonium nitrate | 40 | 40 | 40 | 40 |
| DAC [1] | 10 | 10 | 10 | 10 |
| Triton X-171 [2] | 0.5 | 0.5 | 0.5 | 0.5 |
| Triton B-1956 [2] | 0.5 | 0.5 | 0.5 | 0.5 |

[1] Deoiled aromatic concentrate obtained from effluent of normal butane cracking furnace.
[2] Emulsifiers.

Water was added to make 1 pint of spray material. The entire pint was applied to 1-square yard of Bermuda grass infested with crab grass. The adjoining grass was used as control. The amounts of 2,5-dithiahexane-cuprous cyanide compound used correspond to 20, 30, 40, and 50 pounds per acre. One week after application, the crab grass in the sprayed plots was 100 percent killed at all concentrations of the 2,5-dithiahexane-cuprous cyanide addition product while the Bermuda grass was not injured. The ammonium nitrate and DAC appear to enhance the herbicidal value of the spray. They are not effective herbicides in their own right, however, unless applied at much higher concentration. Then their action is of a nonselective nature. Thus, in a test, as in the following example, 2,5-dithiahexane-cuprous cyanide gave no conclusive result.

EXAMPLE III 2,5-dithiahexane-cuprous cyanide was applied alone as a herbicide. It was mixed with kaolin clay and applied as a dust to one square yard of crab grass infested Bermuda at a rate of application corresponding to 50 pounds per acre. The grass was sprinkled lightly with water before application of the dust. After one week, very little effect was noted to either the crab grass or the Bermuda.

A test with ammonium nitrate was made, as follows:

EXAMPLE IV (a) Ammonium nitrate was applied as a solution in water at a concentration of 40 (4 grams/pint water) pounds per acre to crab grass infested Bermuda. Triton X-100 was used as a wetting agent. After two weeks both grasses were unharmed; each was growing rapidly, having a rich brilliant green color;

(b) DAC (deoiled aromatic, 15 grams/pint of water, concentrate obtained from effluent of dehydrogenation of hydrocarbons, e.g., ethane, propane and butane) was applied as an emulsion in water at a concentration of 150 pounds per acre to crab grass infested Bermuda. Nalcamine G-11 was used as the emulsifying agent. After two weeks, both the crab grass and the Bermuda grass were chlorotic and apparently badly injured. Obviously, the wetting agent and emulsifying agent are not active and others available can be used in lieu thereof.

It is noteworthy that the addition compounds of the present invention are herbicidal in character and that 2,5-dithiahexane-cuprous cyanide compound is a very good selective herbicide for crab grass control in Bermuda grass lawns. Cuprous n-butyl sulfonium cyanide is less selective at same application rates than the 2,5-dithiahexane-cuprous cyanide and tends to injure the Bermuda grass when a kill of crab grass of 90 percent is obtained.

It is also noteworthy that the compounds of the present invention are very good insecticides. This is borne out by the action of 2,5-dithiahexane-CuCN on grasshoppers and cockroaches.

Reasonable variation and modification are possible within the scope of the foregoing disclosure and the appended claims to the invention, the essence of which is that there have been provided heavy metal cyanide addition products of alkyl thioethers and alkyl dithioethers, as described, and methods for preparing the same; also, the addition products of the invention are, according to further invention, found to possess herbicidal and insecticidal efficacy as described.

We claim:

1. An addition product of cuprous cyanide and a compound selected from the group consisting of alkyl thioethers and alkyl dithioethers in which any alkyl group contains 1–12 carbon atoms.
2. A product according to claim 1 wherein the alkyl is a primary alkyl.
3. A product according to claim 1 wherein the alkyl is a secondary alkyl.
4. A product according to claim 1 wherein the alkyl is a tertiary alkyl.
5. 2,5-dithiahexane-cuprous cyanide addition product.
6. Di-n-butyl sulfide-cuprous cyanide addition product.
7. A method for preparing 2,5-dithiahexane-cuprous cyanide addition product which comprises reacting together 2,5-dithiahexane and cuprous cyanide.
8. A method for preparing an addition product of di-n-butyl sulfide and cuprous cyanide which comprises bringing these compounds together and allowing a reaction to ensue.

References Cited in the file of this patent

UNITED STATES PATENTS

| | | |
|---|---|---|
| 2,433,742 | Davis | Dec. 30, 1947 |
| 2,512,044 | Swaney et al. | June 20, 1950 |
| 2,531,276 | Klingel | Nov. 21, 1950 |
| 2,810,675 | De Benneville et al. | Oct. 22, 1957 |
| 2,845,446 | Soule | July 29, 1958 |
| 2,880,223 | Coates et al. | Mar. 31, 1959 |